Oct. 13, 1964 H. C. SWIFT 3,152,664
HOLD-DOWN DEVICE FOR BRAKE SHOES
Filed Jan. 18, 1963
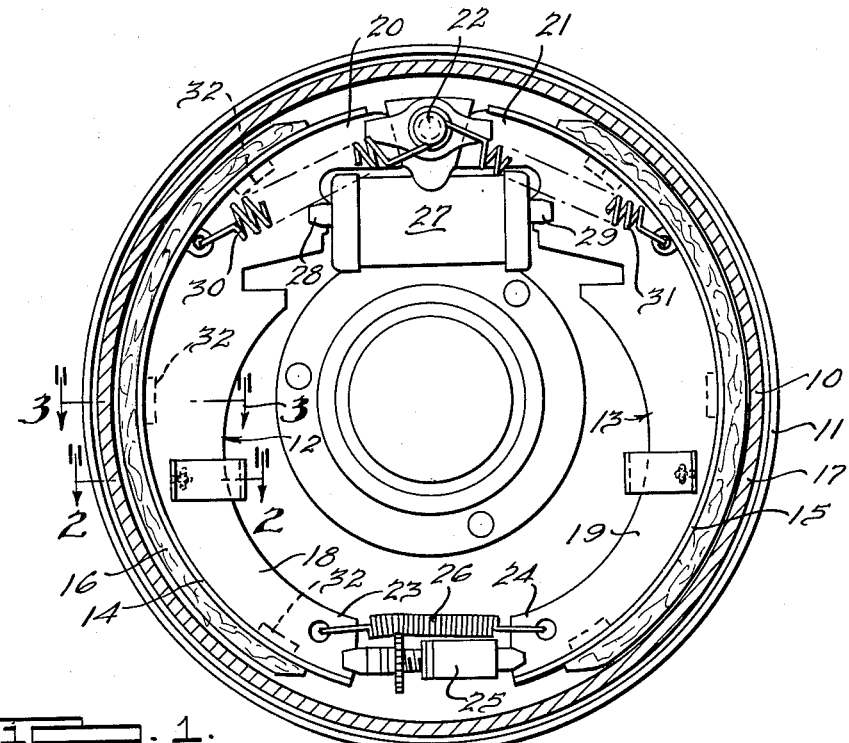
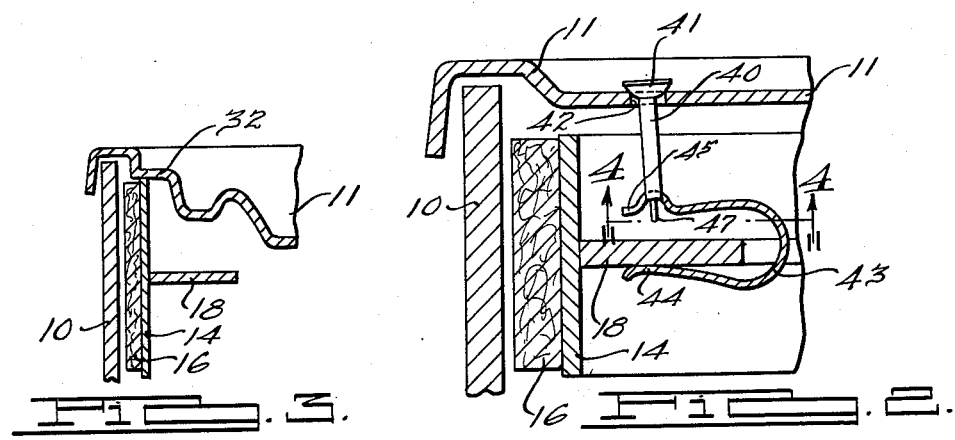
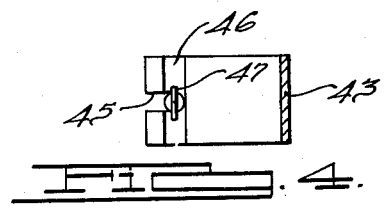
INVENTOR.
Harvey C. Swift.
BY
Harness, Dickey & Pierce
ATTORNEYS.

United States Patent Office 3,152,664
Patented Oct. 13, 1964

3,152,664
HOLD-DOWN DEVICE FOR BRAKE SHOES
Harvey C. Swift, Birmingham, Mich., assignor to Kelsey-Hayes Company, Romulus, Mich., a corporation of Delaware
Filed Jan. 18, 1963, Ser. No. 252,402
7 Claims. (Cl. 188—78)

This invention relates to vehicle brakes and, particularly, to drum type brakes that comprise an annular brake drum, arcuate brake shoes having rim portions supporting brake linings, and a stationary backing plate upon which the brake shoes are supported, with the edges of the rim portions thereof in engagement therewith, and with respect to which the brake shoes are movable upon actuation thereof by the brake actuating mechanism.

More particularly, the present invention relates to hold-down devices for brake shoes whereby the brake shoe is adjustably connected to the backing plate in such a manner as to permit the maximum amount of relative angular movement of the brake shoe.

In many of the prior art structures the use of hold-down devices involved the formation of opposed accurately positioned apertures in the web of the brake shoe and the backing plate because the hold-down device usually comprised a rod passing through these apertures and spring means carried thereby for resiliently urging the brake shoe toward the backing plate. Also, in some of the prior art devices the hold-down device has extended frictional contact with the brake shoe or backing plate or both, which deleteriously affects the operation of the brake.

In brakes of the above type involving primary and secondary shoes in which the shoes partake of a servo or wrap-around action, the resulting movement of the brake shoes is both circumferential of the brake drum and radial thereto and the hold-down devices must permit both such movements in an uninhibited manner.

It is therefore an object of this invention to provide a hold-down device which may be readily assembled with the brake structure without the use of aligned apertures and in which the frictional component between the parts is reduced to a minimum.

Another object of the invention is to provide a device of this type in which the hold-down device permits the brake shoe to partake of both circumferential and radial movement without interference and in which the hold-down device adjusts or repositions itself on the brake shoe web upon extreme movements of the brake shoe.

Further objects of this invention are to provide a device of this type which is efficient, durable, compact, and of simple construction, comprising a minimum number of parts, whereby it may be economically manufactured and quickly and easily assembled.

The various objects and advantages, and the novel details of construction of one commercially practical embodiment of the invention will become more apparent as this description proceeds, especially when considered in connection with the accompanying drawings, in which:

FIGURE 1 is a sectional elevational view of a brake embodying this invention;

FIGURE 2 is an enlarged fragmentary sectional view taken substantially on the plane indicated by line 2—2 in FIGURE 1;

FIGURE 3 is a similar view taken substantially on the plane indicated by line 3—3 in FIGURE 1; and FIGURE 4 is a detail sectional view taken on line 4—4 in FIGURE 2 looking in the direction of the arrows.

The illustrative embodiment of the invention is shown in the drawings as applied to a brake structure of the internal expanding type comprising arcuate brake shoes adapted to cooperate with the inner surface of the brake drum. In FIGURE 1, the reference character 10 indicates a brake drum that is mounted on the wheel hub (not shown) for rotation therewith. A stationary backing plate 11 is mounted on a stationary part of the vehicle (not shown).

In addition to the elements already described, the basic elements of the brake structure comprise a pair of brake shoes 12 and 13 in the form of arcuate segments, said brake shoes being provided with arcuate rim portions 14 and 15 supporting lining elements 16 and 17, respectively; the lining 17 being preferably thicker than the lining 16. The rim portions 14 and 15 are reinforced against flexure by web portions 18 and 19 extending perpendicularly therefrom.

The adjacent ends 20 and 21 of the brake shoes 12 and 13 engage an anchor pin device indicated generally by the reference character 22 fixed to the backing plate 11. The opposite ends 23 and 24 of the brake shoes 12 and 13 engage an adjusting strut 25, with the shoe ends 23 and 24 being retained in engagement with the adjusting strut by means of a tension spring 26.

A hydraulic wheel or brake cylinder 27 having plungers 28 and 29 extending from opposite ends thereof into engagement with the webs 18 and 19 provides the actuating device for moving the brake shoes 12 and 13 into engagement with the brake drum 10. The plunger members 28 and 29 extend from piston members (not shown) within the wheel cylinder 27, hydraulic fluid being delivered into the wheel cylinder between the piston members from a conventional brake pedal operated master cyylinder (not shown). Retraction springs 30 and 31 normally urge the ends 20 and 21 of the brake shoes toward the anchor pin 22 when hydraulic pressure is released from the wheel cylinder 27.

The backing plate 11 may be, and preferably is, formed with a plurality of bearing surfaces 32, here shown as three in number, for each brake shoe, although obviously these bearing surfaces may be omitted and the edges of the brake shoe rims may bear directly upon the backing plate. The bearing surface 32 may be conveniently formed by offsetting the metal of the backing plate 11.

The present invention relates to means for resiliently urging the brake shoe against the bearing surfaces on the backing plate, or against the backing plate if the bearing surfaces are omitted, in such a manner as to permit circumferential and radial movement of the brake shoe relative to the backing plate. Also, the connection between the brake shoe and backing plate is such that the spring element thereof is slidable upon the web of the brake shoe upon excessive movement of the brake shoe, whereby this spring element may reposition itself upon such movement of the brake shoe thereby permitting uninhibited circumferential and radial movement of the brake shoe.

In carrying out the invention, there is provided a rod 40 provided with a semispherical head 41 adapted to engage an aperture 42 in the backing plate 11. The aperture 42 is of smaller diameter than the semispherical head 41, so that this end of the rod 40 is pivotally or rockably supported on the backing plate.

The reference character 43 indicates a substantially C-shape or substantially U-shape leaf spring which straddles or substantially embraces the web of the brake shoe. One end 44 of the leaf spring 43 slidably engages the side of the brake shoe web which is remote from the backing plate 11. The other end of the leaf spring 43 is provided with a slot 45 and a transversely extending groove 46. In assembling the device, the free end of the rod 40 is inserted to extend through the slot 45, and the elongated head 47 on the end of the rod is turned so as to engage the groove 46 to thereby pivotally connect the free end of the rod 40 to the spring 43. The tendency of the spring is for the two ends to approach one another so that when the device is assembled, the rod 40 is placed under tension and the spring tends to resiliently urge the brake shoe toward the backing plate 11 and into engagement with the bearing surfaces 32.

It will be noted that the end 44 of the spring 43 merely slidably engages the side of the web remote from the backing plate, so that the spring 43 is slidable upon the web of the brake shoe. This type of connection between the brake shoe and backing plate not only permits circumferential and radial movement of the brake shoe relative to the backing plate, but, inasmuch as the spring 43 is slidably mounted on the web, it will slide thereon during excessive movement of the brake shoe to thereby reposition itself on the web after any extreme movement of the brake shoe.

It has been found that the device just described, while of simple construction, and thus capable of being economically manufactured and easily assembled, nevertheless provides an efficient connection between the brake shoe and backing plate which effectively accomplishes the purposes of the invention.

While one commercially practical embodiment of the invention has been described and illustrated herein somewhat in detail, it will be understood that various changes may be made as may come within the purview of the accompanying claims.

What is claimed is:

1. In a brake mechanism comprising a backing plate, a brake shoe seated against said backing plate for movement relative thereto, said shoe having a radial web spaced from the backing plate, that improvement which comprises a hold-down device comprising, a rod pivotally connected to said backing plate for rocking movement relative thereto, and a substantially U-shaped spring device having its ends biased together and having one end slidably engaging the side of the web remote from the backing plate and the other end connected to the free end of said rod to resiliently urge said brake shoe toward said backing plate.

2. In a brake mechanism comprising a backing plate, a brake shoe seated against said backing plate for movement relative thereto, said shoe having a radial web spaced from the backing plate, that improvement which comprises a hold-down device comprising, a rod pivotally connected to said backing plate for rocking movement relative thereto, and a substantially C-shaped leaf spring having its ends normally biased toward one another and having one end engaging the side of said web remote from the backing plate and the other end connected to the free end of said rod to resiliently urge said brake shoe toward said backing plate, said leaf spring being slidable on said web upon excessive movement of the brake shoe.

3. In a brake mechanism comprising a backing plate, a brake shoe seated against said backing plate for movement relative thereto, said shoe having a radial web spaced from the backing plate, that improvement which comprises a hold-down device comprising, an opening in the backing plate, a rod having a head engaging said opening to pivotally connect said rod to said backing plate, and a substantially C-shaped leaf spring straddling said web with one end thereof slidably engaging the side of the web remote from the backing plate, the ends of said spring being biased toward one another, and a pivotal connection between the other end of said spring and the free end of said rod whereby said brake shoe is resiliently urged toward said backing plate for movement circumferentially and radially with respect thereto.

4. In a brake mechanism comprising a backing plate, a brake shoe seated against said backing plate for movement relative thereto, said shoe having a radial web spaced from the backing plate, that improvement which comprises a hold-down device comprising, a rod pivotally connected at one end to said backing plate for rocking movement relative thereto, a substantially C-shaped leaf spring extending on both sides of said web with one end thereof slidably engaging the side of the web remote from the backing plate, an elongated head on the free end of said rod, a slot in the other end of said leaf spring to receive said rod, and a groove in said spring end at a right angle to said slot to receive said head to connect said spring and rod together, the ends of said spring being biased toward one another whereby said brake shoe is constantly urged toward said backing plate while permitting circumferential and radial movement thereof relative to said backing plate.

5. A brake mechanism comprising a backing plate having a bearing surface, a brake shoe seated against said bearing surface for movement relative thereto, said shoe having a radial web spaced from the backing plate, and means engaging said web and backing plate to resiliently hold said brake shoe against said bearing surface on the backing plate, said means comprising, a rod pivotally connected at one end to said backing plate for rocking movement relative thereto, and a substantially C-shaped leaf spring straddling said web with one end thereof slidably engaging the side of the web remote from the backing plate, the ends of said C-shaped spring being biased toward one another, and a pivotal connection between the free end of said rod and the other end of said spring to resiliently urge said brake shoe toward the bearing surface on the backing plate, said leaf spring being slidable on said web whereby said leaf spring repositions itself on said web upon extreme movement of the brake shoe.

6. A device as described in claim 5 in which the pivotal connection between the free end of the rod and the end of said spring comprises an elongated head on the free end of the rod, an open end slot in said spring to receive said rod, and a groove in said spring to receive said head to connect said spring and rod together 7. A device as described in claim 5 in which the pivotal connection between said rod and backing plate comprises an aperture in said backing plate and a semi-spherical head on said rod engaging said aperture.

References Cited in the file of this patent

UNITED STATES PATENTS

| | | |
|---|---|---|
| 2,263,949 | Harle | Nov. 25, 1941 |
| 2,544,030 | House | Mar. 6, 1951 |
| 2,557,820 | Frank | June 19, 1951 |
| 2,999,566 | Naudzius | Sept. 12, 1961 |

FOREIGN PATENTS

| | | |
|---|---|---|
| 1,109,268 | France | Sept. 21, 1955 |